(12) United States Patent
Winzen

(10) Patent No.: US 8,072,105 B2
(45) Date of Patent: Dec. 6, 2011

(54) AXIAL BEARING

(75) Inventor: Lothar Winzen, Erkelenz (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 281 days.

(21) Appl. No.: 12/589,644

(22) Filed: Oct. 27, 2009

(65) Prior Publication Data

US 2010/0119183 A1    May 13, 2010

(30) Foreign Application Priority Data

Nov. 12, 2008   (DE) .................. 10 2008 056 878

(51) Int. Cl.
   *D01H 4/00*   (2006.01)
(52) U.S. Cl. ...................... 310/90.5; 384/438
(58) Field of Classification Search ............... 310/90.5; 384/438, 446, 448, 610; 57/404, 406
   See application file for complete search history.

(56) References Cited

U.S. PATENT DOCUMENTS

| | | | |
|---|---|---|---|
| 4,106,192 A | 8/1978 | Stahlecker | 308/172 |
| 5,321,329 A * | 6/1994 | Hovorka | 310/90.5 |
| 5,622,040 A * | 4/1997 | Preutenborbeck et al. | 57/406 |
| 5,668,425 A * | 9/1997 | Marioni et al. | 310/162 |
| 5,987,871 A * | 11/1999 | Winzen | 57/406 |
| 6,298,649 B1 * | 10/2001 | Wassenhoven et al. | 57/406 |
| 6,340,855 B1 | 1/2002 | Wassenhoven et al. | 310/90.5 |

FOREIGN PATENT DOCUMENTS

| | | |
|---|---|---|
| DE | 25 14 734 | 10/1976 |
| DE | 100 50 694 A1 | 4/2002 |
| EP | 1 043 431 B1 | 10/2000 |
| EP | 1 101 845 B1 | 5/2001 |

* cited by examiner

*Primary Examiner* — Quyen Leung
*Assistant Examiner* — Naishadh Desai
(74) *Attorney, Agent, or Firm* — K&L Gates, LLP

(57) ABSTRACT

An axial bearing for a high speed open-end spinning rotor mounted without axial thrust in a support disc bearing arrangement has a static magnetic bearing component secured in a bearing housing with at least two axially polarized permanent magnet rings limited by pole discs, and a dynamic magnetic bearing component having ferromagnetic webs on the rotor shaft at the spacing of the pole discs. The static magnetic bearing component (27) is arranged inside a plastic bearing bush (30) and secured by a plastic closing lid (31). The front side of the closing lid (31) has a stop journal (50) forming an axial emergency operation bearing and the rear side has a conically widened fastening lug (51) which is elastically deformed as installed.

9 Claims, 3 Drawing Sheets

AXIAL BEARING

CROSS-REFERENCE TO RELATED APPLICATIONS

This application claims the benefit of German patent application 10 2008 056 878.3, filed Nov. 12, 2008, herein fully incorporated by reference.

FIELD OF THE INVENTION

The present invention relates to an axial bearing for a spinning rotor driven at a high rotational speed, and more particularly to such a bearing for a spinning rotor mounted in the bearing interstice of a support disc bearing arrangement of an open end spinning device.

In conjunction with open-end rotor spinning machines, spinning assemblies have been known for a long time, in which the spinning rotor circulating at a high rotational speed in a negative pressure-loaded rotor housing is supported by its rotor shaft in the bearing interstices of a support disc bearing arrangement, typically comprising two pairs of support disks, and is positioned by means of a mechanical axial bearing arranged at the end. The axes of the two support disc pairs are set in such a way that an axial thrust is exerted on the rotor shaft and holds the rotor shaft abutting the mechanical axial bearing.

With this type of spinning rotor bearing arrangement described in detail, for example, in German Patent Publication DE-OS 25 14 734 and proven in practice, rotor speeds of greater than 100,000 rpm can be realised.

The disadvantage in this type of spinning rotor bearing arrangement is, however, that because of the setting of the support discs between the running surfaces of the support discs and the rotor shaft, increased friction occurs, which leads to a heating of the running surfaces of the support discs. Owing to this frictional heat, not only are the running surfaces of the support discs considerably stressed, but additional energy is also necessary to overcome this friction.

In the case of spinning rotor bearing arrangements of this type, the mechanical axial bearings are also subject to not inconsiderable wear even with lubrication as specified.

It has therefore already been proposed in the past to mount the spinning rotors free of axial thrust and to replace the mechanical axial bearings by wear-free magnetic axial bearings. Open-end spinning devices, in which the spinning rotor is supported in a manner free of axial thrust in the bearing interstices of a support disc bearing arrangement and positioned by a magnetic axial bearing arranged at the end of the rotor shaft, are known, for example, from European Patent Publication EP 1 043 431 A1, European Patent Publication EP 1 101 845 B1 or German Patent Publication DE 100 50 694 A1.

Magnetic axial bearings of this type, for example, have a static magnetic bearing component with two permanent magnet rings limited on either side by pole discs and an associated dynamic magnetic bearing component, which is formed by three ferromagnetic webs arranged at the spacing of the pole discs on the rotor shaft of the spinning rotor. As, in such magnetic axial bearings, the ferromagnetic webs of the dynamic magnetic bearing component absolutely have to be prevented, during spinning operation or during rotor cleaning, in which the spinning rotor on the support disc bearing arrangement is loaded with a tilting moment, from running against the pole discs of the static magnetic bearing component, these magnetic axial bearings are also equipped with protective mechanisms, which reliably prevent physical contact between the two magnetic bearing components.

In the axial bearing according to European Patent Publication EP 1 043 431 A1, the static magnetic bearing component is, for example, arranged in a bearing bush, which is axially displaceably arranged in the bearing housing of the axial bearing and can be positioned by an excenter element. The bearing bush and a locking means screwed into the bearing bush, which secures the static magnetic bearing component in the bearing bush, are in this case manufactured from a non-ferromagnetic metal, for example from brass. The locking means is also equipped with a support element, which is both an axial and a radial stop protection device for the rotor shaft of the spinning rotor. In other words, the locking means has a protective sleeve with support faces, which are provided with a coefficient of friction-reducing and wear-protected surface layer and are arranged at a slight radial spacing with respect to the rotor shaft.

The magnetic axial bearing according to European Patent Publication EP 1 101 845 B1 has a comparable structure. In this known axial bearing, as well, the static magnetic bearing component is arranged in a bearing bush, which is manufactured from a non-ferromagnetic metal and is axially displaceably arranged, and can be positioned by an excenter element, in the bearing housing of the axial bearing. This known axial bearing also has an axial emergency operation bearing in the form of a ceramic pin, which is let into the locking means closing the bearing bush, as well as a radial stop protection device, which is also configured as a ceramic pin.

Although, with the above-described axial bearings it is possible to prevent the magnetic bearing components of these axial bearings coming into direct contact with one another, these axial bearings are relatively expensive, however, because of their design structure and the materials used.

SUMMARY OF THE INVENTION

In view of the aforementioned prior art, it is an object of the present invention to develop a magnetic axial bearing, which is not only operationally reliable, but also very economical to produce.

This object is addressed according to the present invention by an axial bearing for a spinning rotor rotated at a high rotational speed mounted free of axial thrust in a bearing interstice of a support disc bearing arrangement of an open-end spinning device. The bearing comprises a static magnetic bearing component and a dynamic magnetic bearing component, the static magnetic bearing component being secured in a bearing housing and having at least two axially polarized permanent magnet rings limited on either side by pole discs, and the dynamic magnetic bearing component being formed by ferromagnetic webs arranged on the rotor shaft of the spinning rotor at the spacing of the pole discs. According to the present invention, the static magnetic bearing component is arranged inside a bearing bush of a plastics material and is secured by a closing lid of a plastics material and in that the closing lid, on a front side thereof facing the static magnetic bearing component, has a stop journal forming an axial emergency operation bearing and, on a rear side thereof, has a conically widened fastening lug which is elastically deformed in the installed state.

The configuration of an axial bearing according to the invention, in which the static magnetic bearing component is arranged inside a bearing bush manufactured from a plastics material and is secured precisely in position in the bearing bush by a closing lid manufactured from a plastics material, is not only distinguished by a relatively simple structure, the few components of which can be manufactured as injection molded parts and are therefore economical to produce, but also has the advantage that the previously conventional additional axial emergency operation bearing can be dispensed with. In other words, the closing lid, which, on its rear, has a conically widened fastening lug, is equipped on its front side facing the static magnetic bearing component, with a molded-on stop journal, which, if necessary, is used as an axial emergency operation bearing.

According to another aspect of the present invention, the closing lid may preferably be manufactured from polyetheretherketone. This material also known by the abbreviation PEEK, is a high temperature-resistant thermoplastic plastics material, which is relatively resistant to high mechanical stresses, such as can occur when starting up the rotor shaft.

In a further aspect of the present invention, it is provided in an advantageous embodiment that the closing lid can be non-positively secured in the bearing bush by means of its fastening lug. In other words, the closing lid is introduced from behind into the central receiver of the bearing bush and displaced forward until it rests with its front face on the magnetic bearing component of the static magnetic bearing component. During the positioning of the closing lid, the conical fastening lug of the closing lid is elastically deformed in such a way that a press fit, by means of which both the closing lid and the magnetic bearing components are reliably secured in the bearing bush, is produced between the wall of the central receiver of the bearing bush and the fastening lug.

A still further aspect of the present invention provides that the closing lid may be equipped on its front side, in an advantageous embodiment, with a radial stop protection device for the rotor shaft of the spinning rotor. Moreover, each of the pole discs may have an internal cross-section which, in the region of a vertically arranged axis in the installed state of the pole discs, has a larger extent than in the region of an axis arranged orthogonally with respect to the vertical axis. The use of pole discs of this type, relative to the pole discs previously conventional in axial bearings with a circular internal cross-section leads to a change in the strength of the radial magnetic force component of the axial bearing. In other words, owing to a relatively wide annular gap in the upper region of the vertical axis of symmetry, not only is there a significant weakening of the strength of the upwardly directed radial force component of the magnetic axial bearing, the axial rigidity of the bearing remaining virtually unchanged because of the still relatively small annular gap width in the remaining regions, but also, space is provided for the positioning of a radial stop protection device for the rotor shaft of the spinning rotor owing to the relatively wide annular gap between the pole disc and rotor shaft. This radial stop protection device integrated into the closing lid reliably prevents the ferromagnetic webs of the dynamic magnetic bearing component and the pole discs of the static magnetic bearing arrangement component being able to contact one another when the spinning rotor supported on the support disc bearing arrangement is loaded with a tilting moment during spinning operation or in particular during rotor cleaning. Even a possible brief running of the rotor shaft against the radial stop protection device is substantially non-problematical, in this case, as owing to the softer material of the closing lid, the rotor shaft of the spinning rotor is prevented from being damaged.

In accordance with another aspect of the present invention, the pole discs may preferably have an internal cross-section with the shape of an oval. In the case of pole discs, the internal cross-section of which has the shape of an oval, with corresponding orientation in relation to the rotor shaft, the radial force component of a magnetic axial bearing can easily be reduced to such an extent that, in particular after rotor cleaning, for example by means of an automatically operating clearing assembly, it is ensured that the rotor shaft is already pressed back by the tangential belt particular to the textile machine or by the tension roller particular to the spinning station before the spinning station starts up again, into its operating position and is positioned according to specifications on the support disc bearing arrangement.

The bearing bush, in an advantageous embodiment, in the region of its lateral surface, may have a longitudinal groove which corresponds with a guide bolt projecting into a bearing bore of the bearing housing (claim 6). It can be ensured relatively easily by a combination of this type of guide bolt/longitudinal groove, that the bearing bush can only be positioned in the orientation according to specifications in the bearing housing, and in conjunction with the embodiments described in claims 7 and 8, this ensures that the pole discs of the static magnetic bearing component are always positioned at a precise angle during spinning operation.

BRIEF DESCRIPTION OF THE DRAWINGS

The invention will be described in more detail below with the aid of the embodiments shown in the drawings, in which.

DETAILED DESCRIPTION OF THE PREFERRED EMBODIMENTS

Figure 1:
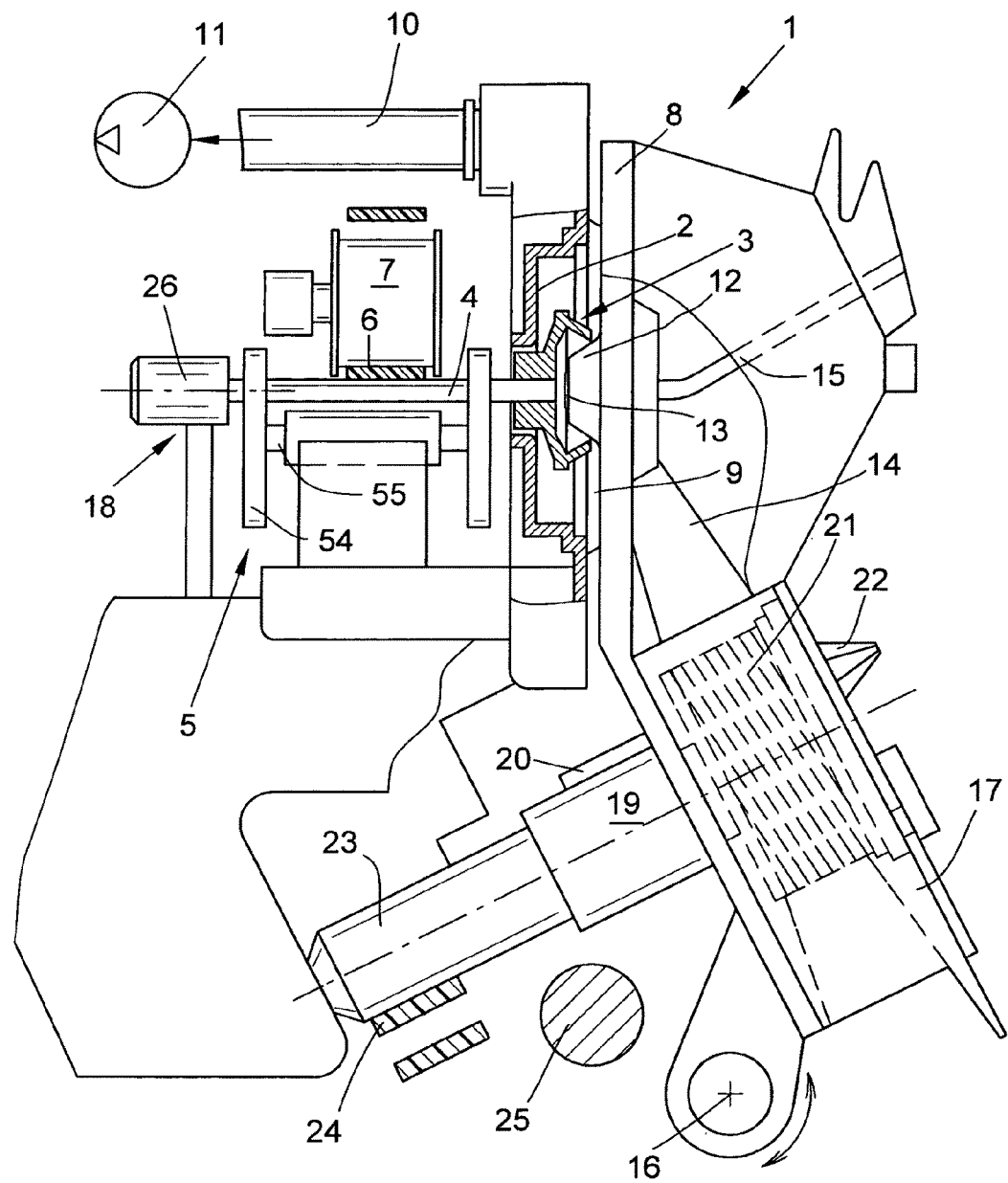
FIG. 1 shows an open-end spinning device with a spinning rotor, which is supported by its rotor shaft in the bearing arrangement interstices of a support disc bearing arrangement and is positioned by means of a magnetic axial bearing which has the configuration according to the invention.

The open-end spinning device shown in FIG. 1 as whole has the reference numeral 1. Spinning devices of this type, as known, in each case have a rotor housing 2 in which the spinning cup of a spinning rotor 3 rotates at a high rotational speed. The spinning rotor 3 is, in this case, supported by its rotor shaft 4 in the bearing interstice of a support disc bearing arrangement 5 and is driven by a first tangential belt 6 along the machine, which is set by a tension roller 7.

Figure 2:
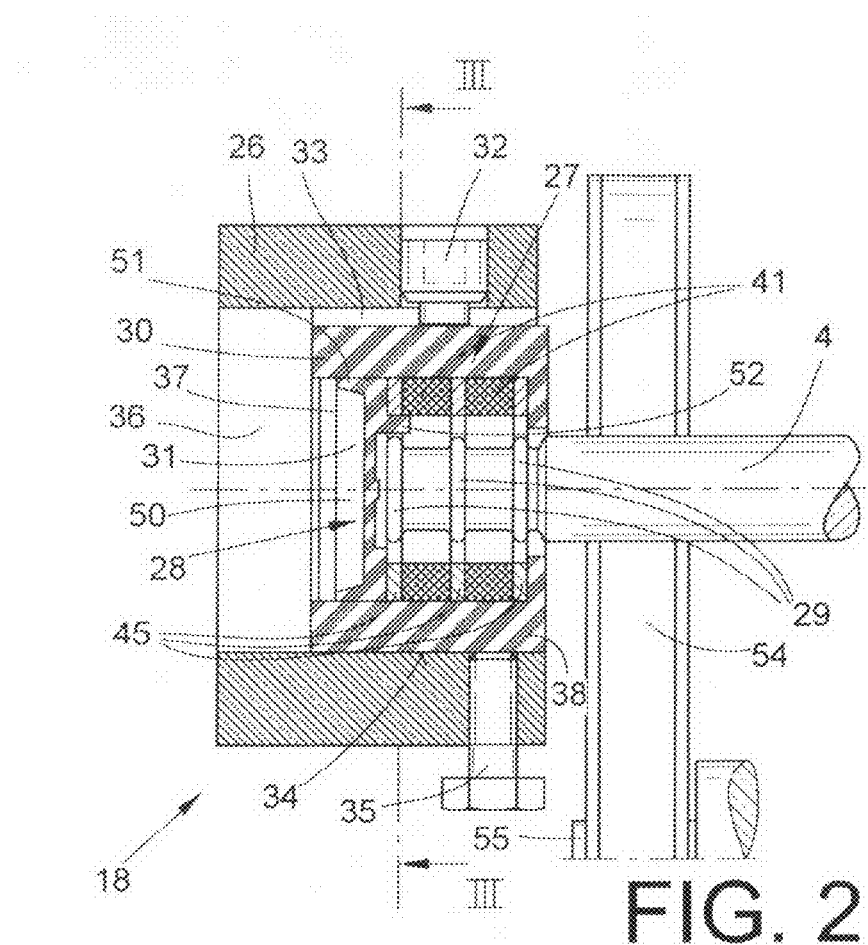
FIG. 2 shows, in a side view, the magnetic axial bearing shown in FIG. 1 to a larger scale and in section.

The axial positioning of the rotor shaft 4 on the support disc bearing 5 takes place by means of a permanent magnetic axial bearing 18, which is shown in section and in detail in FIG. 2.

As can be seen from FIG. 1, the rotor housing 2 which is open at the front per se is closed during operation by a pivotably mounted lid element 8, in which a channel plate (not shown in more detail) with a seal 9 is let. The rotor housing 2 is also connected by a corresponding negative pressure line 10 to a negative pressure source 11, which produces the negative spinning pressure required during the spinning process in the rotor housing 2. A channel plate adapter 12, which has the thread draw-off nozzle 13 and the mouth region of the fibre guide channel 14, is arranged in the lid element 8. A thread draw-off tube 15 adjoins the thread draw-off nozzle 13. Moreover, an opening roller housing 17 is secured to the lid element 8, which is rotatably mounted to a limited extent about a pivot pin 16. The lid element furthermore has bearing brackets 19, 20 at the rear to mount an opening roller 21 or a fibre band draw-in cylinder 22. The opening roller 21 is driven, in the region of its wharve 23, by a circulating second tangential belt 24 along the length of the machine, while the drive (not shown) of the fibre band draw-in cylinder 22 is preferably implemented by means of a worm gear, which is switched to a drive shaft 25 along the machine.

FIG. 2 shows the axial bearing according to the invention in detail, the axial bearing 18 being shown in longitudinal section. Of the support disc bearing 5 shown in FIG. 1, only the rear support disc 54 with the associated bearing shaft 55, is indicated. The magnetic axial bearing as a whole consists of a static magnetic bearing component 27, which is arranged by means of a bearing bush 30 in a bearing housing 26, and of a dynamic magnetic bearing component 28, which is formed by ferromagnetic webs 29 on the rotor shaft 4 of the spinning rotor 3. The ferromagnetic webs 29 of the dynamic magnetic bearing component 28 in this case preferably have the same width as the pole discs 45 of the stationary magnetic bearing component 27.

As known per se, the static magnetic bearing component 27 has permanent magnet rings 41 with respective pole discs 45 arranged on either side.

Figure 3:
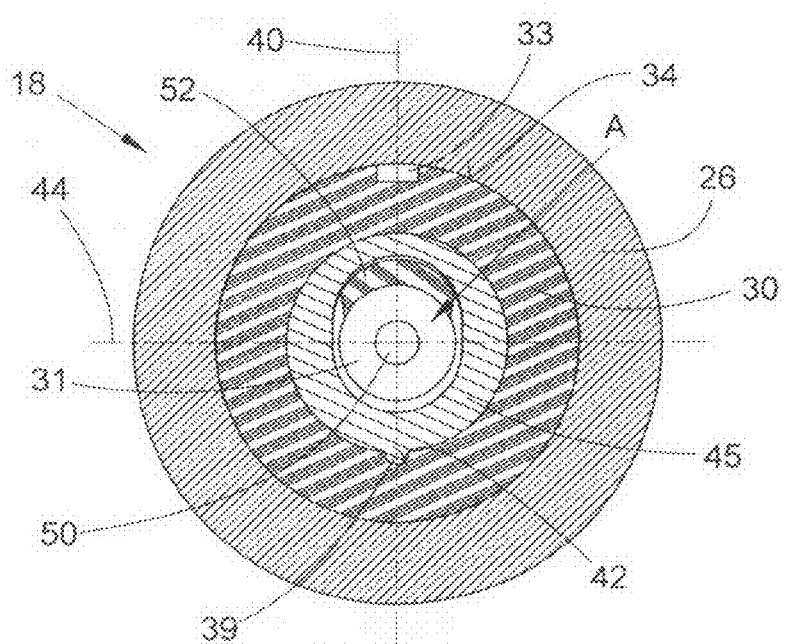
FIG. 3 shows the magnetic axial bearing shown in FIG. 2, in accordance with the section of FIG. 2.
Figure 4:
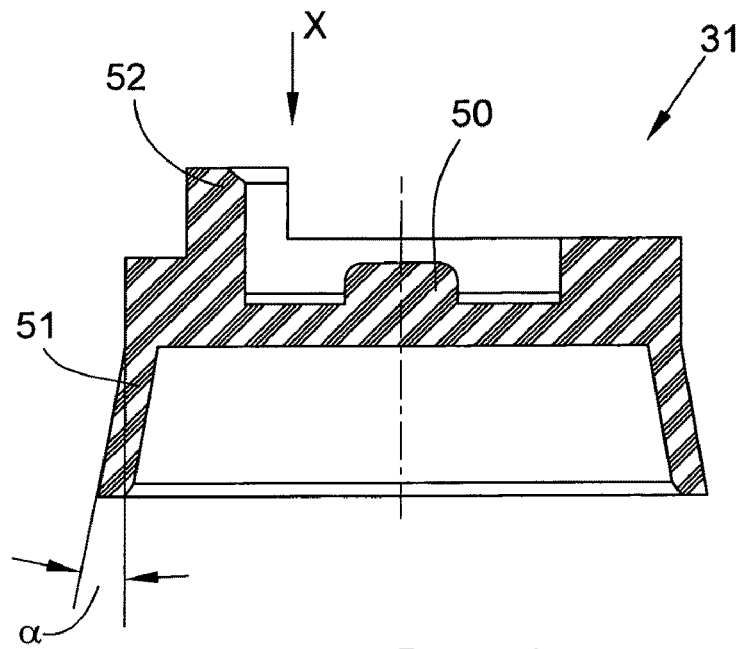
FIG. 4 shows the closing lid for securing the magnetic bearing components of a static magnetic bearing component, in a side view and in section.
Figure 5:
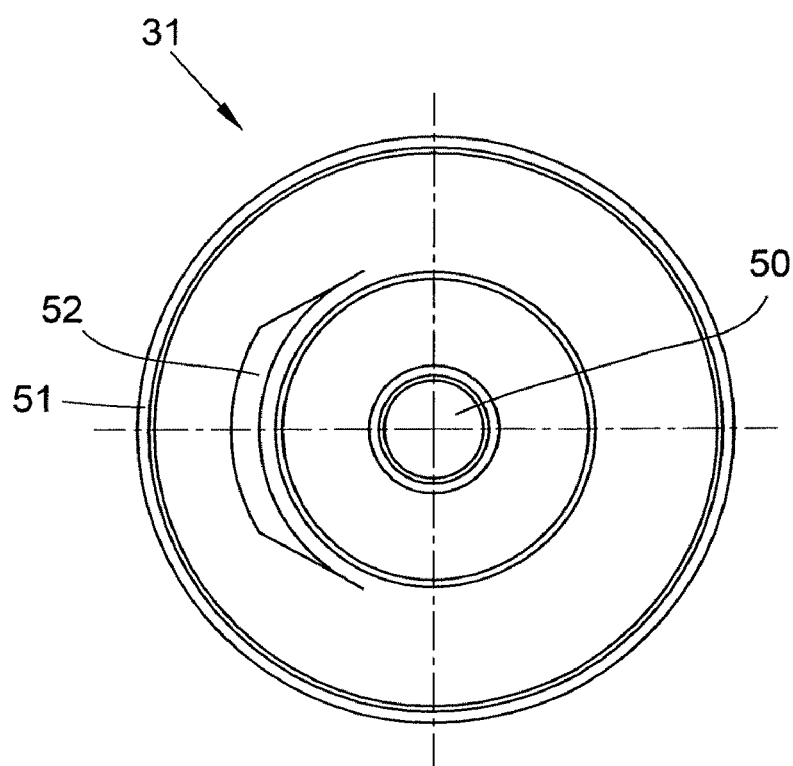
FIG. 5 shows the closing lid shown in FIG. 4, according to arrow X of FIG. 4.

The permanent magnet rings 41 are preferably formed by axially polarized rare-earth magnets, the same poles (N/N or S/S) opposing one another. As can be seen in particular from FIG. 3, the pole discs 45, which advantageously have an oval internal cross-section A, are arranged at a precise angle inside the bearing bush 30 by a centring lug 39, which corresponds with a guide groove 42 in the bearing bush 30, and consist of a ferromagnetic material, preferably of steel. The pole discs 45 and the permanent magnet rings 41 are secured inside the bearing bush 30 manufactured from plastics material by a closing lid 31, which is also produced from a plastics material. In this case, at least the closing lid 31, which, as can be seen in particular from FIGS. 4 and 5, has a rear, conically widened fastening lug 51, a stop journal 50 pointing in the direction of the rotor shaft 4, and a radial stop protection device 52 positioned above the rotor shaft 4 in the assembled state, is preferably made of polyetheretherketone.

To secure the magnetic bearing components of the static magnetic bearing component 27, the closing lid 31, once the permanent magnet rings 41 and the pole discs 45 have been placed beforehand in the central receiver 37 of the bearing bush 30, is also introduced into the receiver 37 and displaced forward until the front pole disc 45 rests on the stop ring 38 of the bearing bush 30. The closing lid 30 thus rests non-positively with its elastically deformable fastening lug 51 on the wall of the central receiver 37 of the bearing bush 30 and non-positively secures the magnetic bearing components in the bearing bush 30.

The pole discs 45 have an internal cross-section A with an oval shape, the largest extent of the oval being provided in the upper region of the vertical axis 40. A configuration of this type means that the radial force component of the permanent magnetic axial bearing 18 can be influenced such that the rotor shaft 4 after the ending of the cleaning process, is immediately reliably released by the tangential belt 6 or the tension roller 7 from the stop protection device 52 of the closing lid 31 and is reliably positioned in the bearing interstices of the support disc bearing arrangement 5. The axial rigidity of the magnetic axial bearing 18 is, in this case, substantially retained because of the small air gap in the remaining regions, in particular in the region of the horizontal axis 44.

The bearing bush 30, which, as mentioned above, is preferably also manufactured from a plastics material, can be in turn secured in a bearing bore 36 of the stationary bearing housing 26 of the open-end spinning device 1 and is thus aligned at a precise angle by a guide bolt 32, which engages in a longitudinal groove 33 in the lateral surface 34 of the bearing bush 30, and reliably secured by a screw bolt 35.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present, invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An axial bearing for a spinning rotor rotated at a high rotational speed and mounted free of axial thrust in a bearing interstice of a support disc bearing arrangement of an open-end spinning device, the bearing comprising a static magnetic bearing component and a dynamic magnetic bearing component, the static magnetic bearing component being secured in a bearing housing and having at least two axially polarized permanent magnet rings limited on either side by pole discs, and the dynamic magnetic bearing component being formed by ferromagnetic webs arranged on the rotor shaft of the spinning rotor at the spacing of the pole discs, characterized in that the static magnetic bearing component (27) is arranged inside a bearing bush (30) of a plastics material and is secured by a closing lid (31) of a plastics material and in that the closing lid (31), on a front side thereof facing the static magnetic bearing component (27), has a stop journal (50) forming an axial emergency operation bearing and, on a rear side thereof, has a conically widened fastening lug (51) which is elastically deformed in the installed state.

2. An axial bearing according to claim 1, characterized in that the closing lid (31) is produced from polyetheretherketone (PEEK).

3. An axial bearing according to claim 1, characterized in that the closing lid (31) can be non-positively fixed in the bearing bush (30) by means of its fastening lug (51).

4. An axial bearing according to claim 1, characterized in that the closing lid (31), on its front side, has a radial stop protection device (52) for the rotor shaft (4) of the spinning rotor (3) and in that each pole disc (45) has an internal cross-section (A) which has a larger extent in the region of a vertically arranged axis (40) in the installed state of the pole discs (45) than in the region of an axis (44) arranged orthogonally with respect to the vertical axis (40).

5. An axial bearing according to claim 4, characterized in that the internal cross-section (A) of the pole disc (45) has the shape of an oval.

6. An axial bearing according to claim 1, characterized in that the bearing bush (30) has, in the region of its lateral surface (34), a longitudinal groove (33) which corresponds with a guide bolt (32) projecting into a bearing bore (36) of the bearing housing (26).

7. An axial bearing according to claim 1, characterized in that the bearing bush (30), in the region of a central receiver (37), has an end stop ring (38) and in that a guide groove (42) is arranged in the central receiver (37) and allows a precise angle positioning of the pole discs (45) of the static magnetic bearing component (37) inside the central receiver (37) of the bearing bush (30).

8. An axial bearing according to claim 7, characterized in that each pole disc (45) has a centring lug (39) providing its installation position.

9. A static magnetic bearing component for use in an axial bearing for a spinning rotor, the static magnetic bearing component being secured in a bearing housing and having at least two axially polarized permanent magnet rings limited on either side by pole discs, characterized in that the static magnetic bearing component (27) is arranged inside a bearing bush (30) of a plastics material and is secured by a closing lid (31) of a plastics material and in that the closing lid (31), on a front side thereof facing the static magnetic bearing component (27), has a stop journal (50) forming an axial emergency operation bearing and, on a rear side thereof, has a conically widened fastening lug (51) which is elastically deformed in an installed state.

\* \* \* \* \*